United States Patent [19]

Tada et al.

[11] 3,900,523

[45] Aug. 19, 1975

[54] METHOD FOR PURIFYING HYDROQUINONE AS WELL AS METHOD FOR PURIFYING AND RECOVERING HYDROQUINONE

[75] Inventors: Sugihiko Tada, Minami-Ashigara; Yasuo Nishigaki; Masatoshi Sugiyama, both of Odawara, all of Japan

[73] Assignee: Fuji Photo Film Co., Ltd., Minami-Ashigara, Japan

[22] Filed: Sept. 4, 1973

[21] Appl. No.: 394,209

[30] Foreign Application Priority Data
Sept. 4, 1972 Japan................................. 47-88525

[52] U.S. Cl............................................. 260/621 A
[51] Int. Cl.$^2$......................................... C07C 37/22
[58] Field of Search ......... 260/621 A, 621 B, 621 C

[56] References Cited
UNITED STATES PATENTS

| | | | |
|---|---|---|---|
| 2,679,535 | 5/1954 | Lavender et al................ | 260/621 A |
| 2,736,753 | 2/1956 | Jacobs............................ | 260/621 A |
| 2,744,144 | 5/1956 | Sheffield......................... | 260/621 A |
| 3,043,882 | 7/1962 | Hammond....................... | 260/621 B |

*Primary Examiner*—Howard T. Mars
*Assistant Examiner*—Norman Morgenstern
*Attorney, Agent, or Firm*—Sughrue, Rothwell, Mion, Zinn and Macpeak

[57] ABSTRACT

A crude hydroquinone aqueous solution, produced in a method of preparing hydroquinone in which para-diisopropylbenzene is oxidized and the resulting peroxide is subjected to acid decomposition to form hydroquinone, is purified under such conditions that the concentration of the hydroquinone in an aqueous phase is adjusted to about 23 percent by weight or more, preferably 25 percent by weight or more at a temperature of about 60°C or higher and the entire solution is stirred and then allowed to remain still, whereby a tar phase is separated into an upper layer from the aqueous phase as a lower layer. The thus separated tar phase is thereafter washed with a fresh water thereby to adjust the concentration of hydroquinone in the aqueous phase to about 18 percent by weight or less, preferably 15 percent by weight or less, at a temperature of about 40°C or higher and the entire solution is stirred and then is allowed to remain still as such, whereby the aqueous phase is separated in an upper layer from the tar layer in a lower layer to recover the hydroquinone remaining in the tar phase.

14 Claims, 2 Drawing Figures

METHOD FOR PURIFYING HYDROQUINONE AS WELL AS METHOD FOR PURIFYING AND RECOVERING HYDROQUINONE

BACKGROUND OF THE INVENTION

1. Field of the Invention

The present invention relates to a method for purifying and recovering hydroquinone. More particularly, the invention relates to a method for purifying and recovering hydroquinone from a crude hydroquinone aqueous solution prepared using para-diisopropyl-benzene as a starting material. In the preparation para-diisopropyl-benzene-dihydro-peroxide, formed as an intermediate peroxide derived from the para-diisopropyl-benzene starting material, is subjected to acid decomposition and solvent removal, and then to phase separation thereby to separate and remove tar substances released in the crude hydroquinone solution.

2. Description of the Prior Art

Heretofore, hydroquinone has been prepared from aniline via quinone, by means of the so-called aniline method. In this aniline method, however, manganese sulfate which is formed thereby is harmful to the human body and causes trouble from the stand point of pollution. The aniline method therefore is defective because of the necessity for equipment for the removal of such public nuisance, this thereby, causes an increase in the cost of the product.

In view of these problems, the so-called P-DIPB method was subsequently developed, in place of the aniline method, where hydroquinone is prepared from para-diisopropyl-benzene. The P-DIPB method for producing hydroquinone can be represented by the following schematic

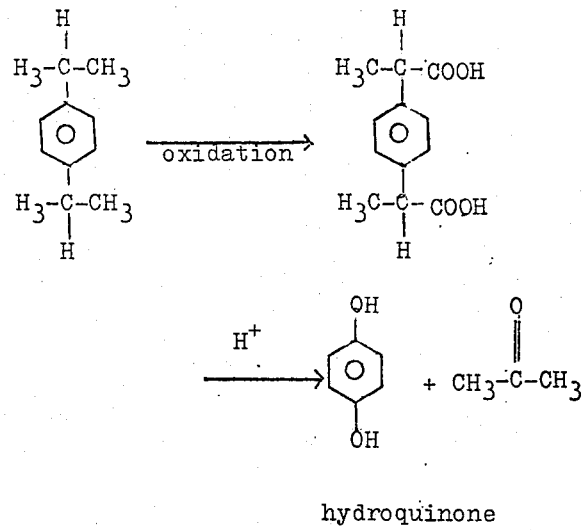

hydroquinone

However, this new P-DIPB method also has a disadvantage, a new difficulty in that the crude hydroquinone aqueous solution prepared by subjecting para-diisopropyl-benzene dihydro-peroxide, which is an intermediate peroxide synthesized from the starting material para-diisopropyl-benzene, as described above to acid decomposition and solvent removal, contains tar substances mainly consisting of by-products.

These tar substances consists of number of by-products such as di-carbinol, isopropylphenol, etc., raw materials and the like, and are dark brown. These tar substances are very highly viscous at room temperature. The difference between the specific gravity of the tar phase comprising the tar substances and that of the aqueous phase comprising hydroquinone is extremely slight, and so the two phases generally form a mixed phase. Thus, it has hitherto been very difficult to separate the two phases from each other. The specific gravity of each of the tar phase and the aqueous phase is as in the following Table 1, as measured by the present inventors:

Table 1

Specific Gravity - Aqueous phase, Tar phase (80°C)

|  | Aqueous Phase | Tar Phase |
| --- | --- | --- |
| Amount of Hydroquinone | 33.0% | 20.1% |
| Specific Gravity | 1.044 | 1.046 |
| Amount of Hydroquinone | 27.0% | 10.5% |
| Specific Gravity | 1.032 | 1.033 |
| Amount of Hydroquinone | 32.4% | 8.1% |
| Specific Gravity | 1.027 | 1.018 |

The amount of the tar substances formed is small when the purity of para-diisopropyl-benzene dihydroperoxide, which is an intermediate product, is fairly high, and so the hydroquinone product can possibly be purified by means of an extraction method using halogenated aliphatic hydrocarbons (refer to Japanese Pat. Appln. No. 52986/70) or the like. In this case, therefore, no serious difficulty or inconvenience occurs. Whereas, when the purity of the para-diisopropyl-benzene dihydro-peroxide is low, such as 30 to 50 percent, the amount of the tar substances formed increases to nearly the amount of the hydroquinone aqueous solution. For the purification of such crude hydroquinone containing a larger amount of tar substances, the solvent extraction method is not suitable, since in some instances the amount of the solvent used must be extremely large, charges in the purification step are too heavy and expensive, and so on. According to research by the present inventors, it has been found that the amount of the tar substances which are released from an aqueous phase after the acid decomposition and solvent removal is 1.4–1.8 kg per 1 kg of hydroquinone, when the purity of the para-diisopropyl-benzene dihydro-peroxide is about 30 percent.

A primary object of the present invention is to remove almost all of the tar substances from the crude hydroquinone aqueous solution prepared from para-diisopropyl-benzene via para-diisopropyl-benzene dihydro-peroxide, using a simple pretreatment step before purification of the crude solution, particularly when the purity of the intermediate product para-diisopropyl-benzene dihydro-peroxide is low and the amount of the formed tar substances is almost as large as that of the hydroquinone aqueous solution, whereby charges in the following purification step are reduced as much as possible and the cost of the products thereby can be reduced too.

Another object of the present invention is to purify and recover the hydroquinone from the separated tar substances by separating again an aqueous phase containing hydroquinone from the tar phase.

SUMMARY OF THE INVENTION

The objects of this invention are achieved by subjecting the crude aqueous solution containing hydroquinone obtained when the para-diisopropylbenzene dihydroperoxide is acid decomposed to the process of this invention.

The process of this invention comprises adjusting the concentration of the hydroquinone in the aqueous solution to a level of 23 percent by weight or more at a temperature of about 60°C or higher and stirring the so adjusted system. The stirred system is allowed to stand and as a result a phase separation occurs resulting in a tar phase as an upper layer and an aqueous phase containing most of the hydroquinone as a lower layer. These two phases can then be separated and the hydroquinone recovered easily from the lower aqueous phase.

As an additional embodiment of the process of the invention, some hydroquinone is contained in the tar phase separated as described above and this hydroquinone can be recovered from the tar phase by washing the tar phase with water and adjusting the concentration of the hydroquinone in an aqueous phase to a range of 18 percent by weight or less at a temperature of about 40°C or higher. The so adjusted aqueous phase is stirred and subsequently allowed to stand whereby phase separation occurs, this time the hydroquinone aqueous phase being the upper phase and the tar phase being the lower phase. A separation of the two phases formed is made and the hydroquinone in the separated aqueous phase can now be easily recovered. This additional embodiment of the process of this invention permits recovery of the hydroquinone carried over in the tar phase during the initial recovery of hydroquinone from the aqueous solution obtained in the acid decomposition step of the para-diisopropylbenzene dihydroperoxide initially.

DETAILED DESCRIPTION OF THE INVENTION

The amount and the quality of formed tar substances released in a crude hydroquinone aqueous solution prepared from para-diisopropyl-benzene through acid decomposition of the intermediate para-diisopropyl-benzene dihydro-peroxide followed by solvent removal depends upon the purity of the intermediate product para-diisopropyl-benzene dihydro-peroxide, the concentration of the hydroquinone, the temperature of operation and the like. Furthermore, the difference between the specific gravity of the tar substances and that of the aqueous phase is very slight. Accordingly, the time necessary for the separation of the aqueous phase containing hydroquinone from the tar phase varies, and further, the upper and lower positions of the two phases are often reversed during the separation treatment. Thus, there are a lot of difficulties in the separation of the aqueous phase from the tar phase.

The present inventors have confirmed after various experiments that the specific gravity of the aqueous phase differs from that of the tar phase, depending upon the concentration of hydroquinone therein, and have at last found, in view of this fact, a new method for simply separating the tar phase from the aqueous phase by appropriately adjusting the concentration of the hydroquinone.

Figure 1:
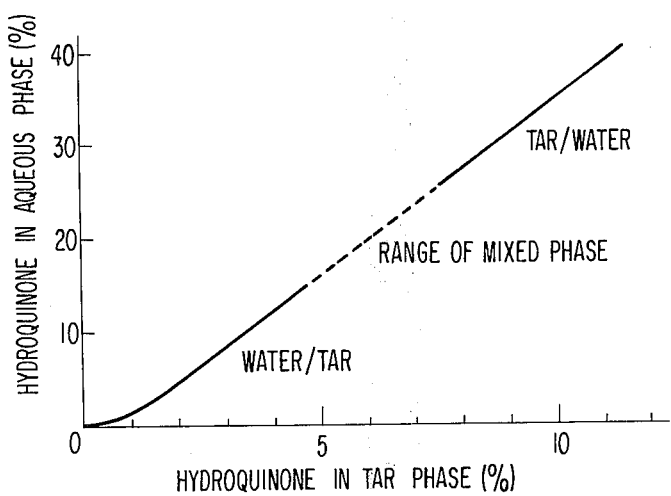
FIG. 1 and FIG. 2 show equilibrium data for hydroquinone in a tar phase and an aqueous phase and the use of these data as hereinafter described.

It is apparent physico-chemically that the specific gravity of the tar phase is different from that of the aqueous phase, depending upon the concentration of hydroquinone in each phase, and this is in general well known. The present inventors have experimented with hydroquinone and have obtained the results as shown in the FIG. 1 attached hereto. The curve as shown in FIG. 1 is in general noticed. More precisely, when the concentration of the hydroquinone in the aqueous phase is about 18 percent by weight, more generally 15 percent by weight or less, the specific gravity of the tar phase is larger than that of the aqueous phase, and thus the crude hydroquinone aqueous solution is partitioned into two layers, an upper layer aqueous phase and a lower layer tar phase.

On the contrary, when the concentration of the hydroquinone in the aqueous phase is about 23 percent by weight or more, more generally 25 percent by weight or more, the specific gravity of the aqueous phase is larger than that of the tar phase, and thus the crude hydroquinone aqueous solution is partitioned into two layers, an upper layer tar phase and a lower layer aqueous phase.

When the concentration of the hydroquinone in the aqueous phase is between the above two cases, i.e., between 18 and 23 percent by weight, the difference between the specific gravity of the aqueous phase and that of the tar phase is very slight, and thus the crude hydroquinone aqueous solution is in a mixed phase.

Considering the solubility of hydroquinone in water, the temperatures of operation must be about 60°C or higher i.e., up to the boiling point, (preferably a temperature of around 60°C is used.) in order to make the concentration of hydroquinone in the aqueous layer about 23 percent or more. Generally, the upper limit is the solubility of hydroquinone in the aqueous layer at a particular temperature. In addition, it is noticed that when the crude hydroquinone solution is heated to about 60°C or higher, tar substances float due to the difference in thermal expansion coefficient, and due to this factor it is very effective to keep the temperature of operation at about 60°C or higher.

In order to separate the tar phase in the lower layer from the aqueous phase in the upper layer, the concentration of hydroquinone in the aqueous phase must be kept about 18 percent by weight or less, and at the same time the temperature of operation must be kept at about 40°C or higher. A temperature of around 60°C is preferred. This is because the tar substances become very highly viscous at room temperature (approximately 20°–30°C) or below. Therefore, it is necessary to keep the temperature of operation at about 40°C or higher in order to easily perform the treatment. The lower limit of the concentration of hydroquinone is basically determined by economic considerations and concentrations near 15 percent by weight are preferred.

Figure 2:
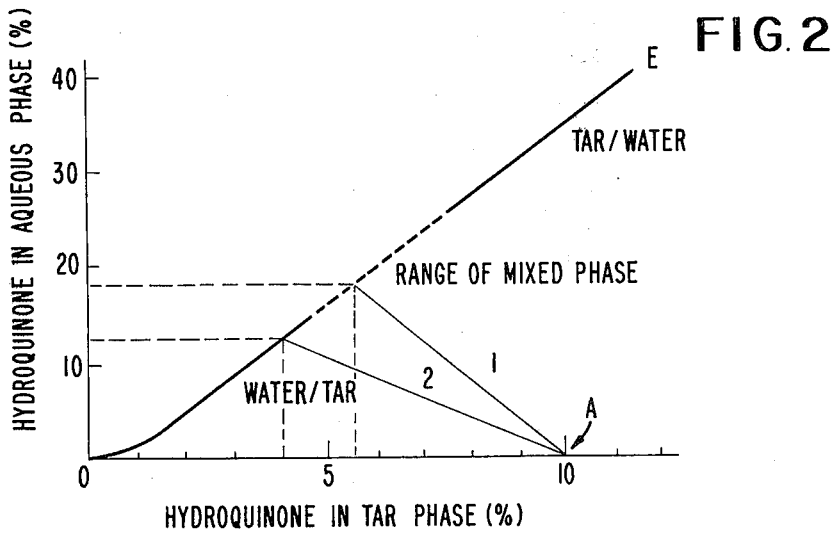

Referring now to the Figures in greater detail, FIG. 1 shows equilibrium data for hydroquinone in the tar phase and the aqueous phase and FIG. 2 shows how these data can be utilized to determine a suitable amount of water to be added to achieve the hydroquinone concentrations above specified, considering the separation of hydroquinone from the tar phase obtained and utilized in the second embodiment of the invention the following explanation is offered. If the hydroquinone concentration in the tar phase before treating is designated $Ct_1$ (wt%), and after treating is $Ct_2$ (wt%), (after water is added) and the hydroquinone concentration in the water added is $Cw_2$ (wt%), or $Cw_1=0$, and after treating is $Cw_2$ (wt%) and if the weight of the tar phase and added water is, $Wt$ and $Ww$, respectively, then the following material balance expression is obtained.

$$Wt (Ct_1 - Ct_2) = Ww (Cw_2 - 0)$$

$$Cw_2 = \frac{Wt}{Ww} (Ct_1 - Ct_2)$$

From the above equation the amount of water to be added can be determined.

Referring now to FIG. 2, if $Ct_1 = 10\%$, the condition of before treating is A point in FIG. 2 and, if $Wt/Ww = 4$ then line 1 in FIG. 2 operates extending line 1 to the equilibrium line E and to the $y$ axis as indicated by the dotted line continuation of line 1 a concentration of about 18 percent by weight of hydroquinone in the aqueous phase is seen. This is not suitable since it is above the 15 percent limit for this embodiment. If the amount of water ($Ww$) is adjusted so that $Wt/Ww = 2$, then line 2 operates and following the same procedures above described a concentration of 12% hydroquinone in the aqueous phase is obtained and this is suitable for separation since it is less then 15 percent required in this embodiment.

As is clear from the above description, the amount of added water can easily be determined from the initial concentration of the hydroquinone in the tar phase and the amount of the tar phase.

In the present invention, the method for recoverying hydroquinone by separating and removing tar substances from a crude hydroquinone solution comprises the following steps:

1. The concentration of hydroquinone in an aqueous phase is adjusted in the range of about 23 percent by weight or more, preferably 25 percent by weight or more at a temperature of about 60°C or higher, (i.e., by adjusting the amount of water added or evaporation off to achieve this concentration) and afterwards the solution is stirred for about 1 to 10 minutes, preferably about 3 to 5 minutes and then allowed to stand still, a tar phase is separated in an upper layer from an aqueous phase in a lower layer. Although the period of time for standing will vary depending on the volume of the mixture, the degree of stirring and the like, generally a period of from about 15 to 60 minutes, preferably about 20 to 40 minutes, is sufficient for a liquid depth of about 1 meter. Recovery of the hydroquinone from the layer separated can be by evaporation and drying up.

2. Hydroquinone still remains in the thus separated tar phase. The recovery of the remaining hydroquinone is performed as follows: The tar phase is washed with fresh water, and thereafter the concentration of hydroquinone in the aqueous phase is adjusted in the range of about 18 percent by weight or less, preferably 15 percent by weight or less, (as described above) at a temperature of about 40°C or higher, and then, after stirring appropriately as described above, the solution is allowed to remain still as set forth hereinbefore, whereby the aqueous phase is separated in an upper layer from the tar phase in a lower layer. For the water-washing with the fresh, either of batch water-washing process or a continuous water-washing process can be employed.

In the batch process, fresh water is added in an appropriate amount and thereafter the entire mixture is stirred and then allowed to stand. These steps are repeated until the amount of the hydroquinone remaining in tar becomes less than a determined amount.

In the continuous process, a plurality of stirring troughs and washing troughs are connected in series and the water for washing is contacted countercurrently with tar substances in the troughs, whereby the stirring and the permitting to stand steps are repeated. Usually, 3 to 5 repetitions are sufficient with the amount of hydroquinone still remaining being about 0.5 percent by weight. Recovery of the hydroquinone in the separated layers can be by evaporation and drying up.

The present invention will be explained in greater detail by reference to the following Example, which is not intended in any way to limit the scope of the present invention. Unless otherwise indicated all percents and parts are by weight.

EXAMPLE

Para-diisopropyl-benzene was oxidized to synthesize para-diisopropyl-benzene dihydro-peroxide, and the resulting para-diisopropyl-benzene dihydro-peroxide mixture (purity: about 30 percent) was subjected to acid decomposition followed by solvent removal and steam distillation, and thereafter an appropriate amount of water was added to obtain 1.34 liters of crude hydroquinone aqueous solution. The resulting solution was warmed and kept at 80°C in a beaker (2000 ml) and, after being stirred for 5 minutes using an eight-blade turbine (diameter: 50mm) under revolution speed of 170 r.p.m., permitted to stand for 10 minutes, whereby a tar phase was separated as an upper layer from an aqueous phase as a lower layer. While the thus separated solution was still hot at 75°C or above, the tar phase containing 10% hydroquinone was separated and removed, and thereafter hot water (80°C) was added thereto (volume ratio, tar phase: hot water = 1:⅔), and the resulting mixture was again stirred for 5 minutes under the same conditions as described above and permitted to stand for 5 minutes, whereby an aqueous phase was separated as an upper layer from the tar phase as the lower layer. While still hot, the tar phase was separated and removed, and thereafter the same water-washing was repeated four times, whereby the amount of hydroquinone remaining in the tar substances became 0.5 percent by weight or less.

The advantages of the present invention are as follows:

1. Almost all of the by-products formed in the step of acid decomposition of para-diisopropyl-benzene dihydro-peroxide can be separated and removed as a tar phase, and thus, the size of the charges in the final purification step such as by extraction or sublimation can be reduced.

2. By-products can be separated merely by adjusting physical conditions such as temperature of operation, hydroquinone concentration and so on, without the use of any chemical agents such as solvent and the like. Accordingly, the cost of products can be reduced greatly as compared with the case of using chemical agents such as solvents or the like, and moreover, no problems of pollution occur.

3. Since the separated tar substances are washed with water at a temperature of 40°C or higher, the viscosity of the substances is low, and thus, the speed of extraction of hydroquinone from the tar is high. Accordingly, the time for the substances being treated to stay in a stirring through for water-washing is short, and the operation time can be reduced accordingly.

While the invention has been described in detail and with reference to specific embodiments thereof, it will be apparent to one skilled in the art that various changes and modifications can be made therein without departing from the spirit and scope thereof.

What is claimed is:

1. In a process which comprises oxidizing para-diisopropylbenzene to the corresponding dihydroperoxide and subjecting said dihydroperoxide in a solvent to acid decomposition followed by removal of said solvent by steam distillation to form a crude hydroquinone aqueous solution consisting essentially of water, hydroquinone, solvent and tar substances, the improvement which comprises recovering said hydroquinone from said crude hydroquinone aqueous solution by adjusting the concentration of the hydroquinone in the aqueous solution to about 23 percent by weight or more at a temperature of about 60°C. or higher, stirring said aqueous solution, allowing said aqueous solution to stand to form two layers, and removing said tar substances as an upper layer while recovering said hydroquinone in the lower layer.

2. The method of claim 1, wherein said method additionally comprises the steps of recovering the hydroquinone in said tar substances separated as an upper layer by adding water to said tar substances to form an aqueous phase and a tar phase, and adjusting the concentration of hydroquinone in the aqueous phase to about 18 percent by weight or less at a temperature of about 40°C or more to reduce the viscosity of the tar substances, stirring said aqueous solution, allowing said mixture to stand to form two layers, and recovering said hydroquinone as an upper layer.

3. The method of claim 1, wherein said hydroquinone concentration is 25 percent by weight or more.

4. The method of claim 2, wherein said hydroquinone concentration in said second adjustment is 15 percent by weight or less.

5. The method of claim 1, wherein the concentration of hydroquinone is adjusted in the range of about 23 percent by weight or more by removing water from said crude hydroquinone aqueous solution.

6. The method of claim 5, wherein the water is removed by evaporation.

7. The method of claim 1 wherein the temperature of hydroquinone concentration adjustment is about 60°C up to the boiling point of the aqueous solution.

8. The method of claim 1 wherein the maximum concentration of hydroquinone is the solubility limit of the hydroquinone at the temperature of adjusting.

9. The method of claim 1 wherein the stirring is for about 1 to 10 minutes.

10. The method of claim 9 wherein the standing is for a period of from about 15 to 60 minutes.

11. The method of claim 1 wherein the hydroquinone in the lower layer is recovered by evaporation of water and drying up.

12. The method of claim 1 wherein water is substantially the only material added to effect hydroquinone concentration adjustment and recovery.

13. The method of claim 1 wherein up to about 51 percent by weight hydroquinone is initially present in the aqueous solution.

14. The method of claim 2 wherein the washing, stirring and allowing to stand to recover the hydroquinone as an upper layer are repeated from 3 to 5 times.

* * * * *